W. G. ALEXANDER.
WIND-WHEEL.
No. 192,668.  Patented July 3, 1877.
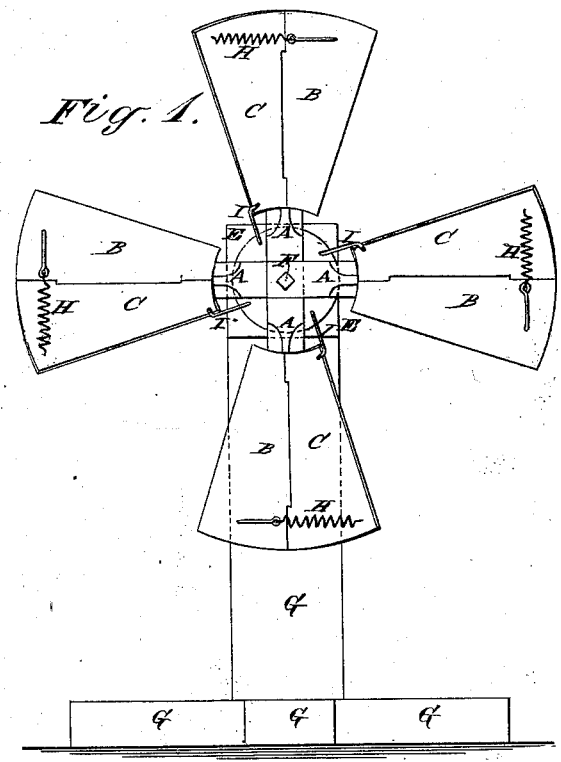
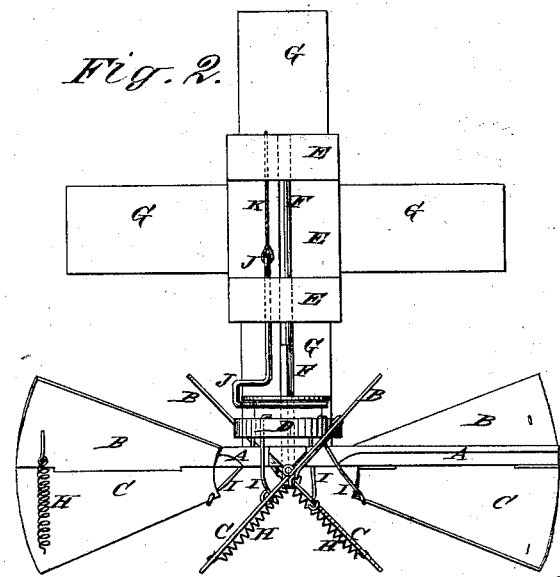
WITNESSES:  INVENTOR:

UNITED STATES PATENT OFFICE.

WILLIAM G. ALEXANDER, OF WINNEMUCCA, NEVADA.

IMPROVEMENT IN WINDMILLS.

Specification forming part of Letters Patent No. 192,668, dated July 3, 1877; application filed June 4, 1877.

*To all whom it may concern:*

Be it known that I, WILLIAM GOWER ALEXANDER, of Winnemucca, in the county of Humboldt and State of Nevada, have invented a new and useful Improvement in Windmills, of which the following is a specification:

Figure 1 is a front view of my improved windmill. Fig. 2 is a top view of the same.

Similar letters of reference indicate corresponding parts.

The object of this invention is to furnish an improved windmill which shall be so constructed that the fans will adjust themselves to the force of the wind, so as to run at a uniform speed, which may be conveniently stopped, and which shall be simple in construction, inexpensive in manufacture, and not liable to get out of order.

The invention consists in a wind-wheel in which the fans are divided longitudinally into two equal parts or sections, hinged to each other at their adjacent edges, and having one section rigidly attached to the arms of the wheel; in the combination of the spiral springs with the hinged parts or sections of the fans; and in the combination of the rods, the small sliding wheel, the sliding rod, and the cord with the hinged sections of the fans, and with the wheel-shaft and the turn-table, as hereinafter fully described.

G represents the tower or frame upon which the wind-wheel is mounted, and in bearings in the top of which the turn-table E revolves.

F is the wheel-shaft, from which motion is taken to the machinery to be driven, and which revolves in bearings attached to the turn-table E.

To the forward end of the shaft F are attached four or more radial arms, A, to which the fans are attached. The fans are divided longitudinally into two equal or nearly equal parts, B C, as shown in Figs. 1 and 2. The parts B of the fans are rigidly attached, at the proper inclination, to the arms A, and to their inner edges are hinged the inner edges of the other or movable parts C.

To the outer parts of the sections B C of the fans are attached spiral springs H, of such a strength as to hold the parts B C of the fans in line with each other against an ordinary wind, but which, should the force of the wind increase, will yield and allow the sections C to swing back and retard the wheel or bring it to a stop should the wind increase to a gale.

To the lower outer corner of the sections C of the fans is attached the forward ends of the rods I, the rear ends of which are attached to the small wheel D. The wheel D slides upon the squared forward part of the shaft F, and is carried around with said shaft in its revolution.

Upon the inner end of the hub of the wheel D is formed a ring-groove to receive the forked end of a rod, J, which slides in a guide-hole in the forward part of the turn-table E, and has a cord, K, attached to its inner end. The cord K extends down into such a position that it may be conveniently reached and operated by an attendant to swing the sections C back and stop the mill when desired.

Having thus described my invention, I claim as new and desire to secure by Letters Patent—

1. A wind-wheel in which the fans are divided longitudinally into two equal parts or sections, B C, hinged to each other at their adjacent edges, and having one section, B, rigidly attached to the arms A of the wheel, substantially as herein shown and described.

2. The combination of the spiral springs H with the hinged parts or sections B C of the fans, substantially as herein shown and described.

3. The combination of the rods I, the sliding wheel D, the sliding rod J, and the cord K with the hinged sections C of the fans, and with the wheel-shaft F and the turn-table E, substantially as herein shown and described.

WILLIAM GOWER ALEXANDER.

Witnesses:
A. SMITH,
W. A. TROUSDALE.